Patented Feb. 2, 1932

1,843,661

UNITED STATES PATENT OFFICE

FRANK B. COONEY, OF SANDUSKY, OHIO

INK PRODUCT

No Drawing.   Application filed December 24, 1928.   Serial No. 328,309.

This invention relates to an improved ink product, preferably in the form of paste which may be conveniently vended in collapsible tubes and which consists of a highly concentrated ink body intended to be diluted and reduced to a required fluid consistency suitable for writing purposes.

More particularly, it is the object of my present invention to improve and increase the utility of an ink paste of the character described in Patent No. 1,479,533, issued to me on January 1, 1924. The product described in said patent essentially comprehends a base of viscid matter combined with gallic acid, ferrous sulphate and suitable coloring ingredients. This composition has sufficient color permanency when diluted to be applicable to all ordinary uses.

It is the particular object of this invention however, to provide such an ink paste composition which, when diluted for writing purposes, will possess greater color permanency and materially increased resistance to the effects of light and water so that the ink composition can be employed for those writings, which, owing to their importance, must be kept as a part of a permanent record and preserved indefinitely.

It is also a further general object of the invention to improve the patented ink paste in the particular just referred to without materially adding to the cost of production and in which all of the advantages of the ink product disclosed in said issued patent are retained.

With the above and other objects in view, which will become apparent in the course of the following description, the invention consists in the improved ink paste composition and in the combination of the several ingredients thereof combined or compounded in substantially the relative proportions as hereinafter explained.

The improved composition forming the subject matter of this application, includes all of the ingredients of the patented ink paste to which there is added a suitable quantity of tannic acid.

I have found that the curve indicating color permanency in an ink containing gallic acid alone in combination with a ferrous sulphate is lower or of less value than one in which both gallic and tannic acids are used. It is therefore, apparent that the greatest color permanency is to be obtained in an ink in which both of these acids have been combined in proper proportions to the ferrous sulphate used therein.

As determined by the most severe tests of such a product, namely, exposing a writing executed therewith to successive exposures to light and water, the color permanency of the ink depends entirely upon the ferrous sulphate, gallic acid and tannic acid and more especially upon the tannic acid.

In compounding the new product, as described in the above referred to patent, I first form a base by mixing a relatively large quantity of viscid matter with two ounces of cold water. Preferably, I use white potato dextrin, one ounce, and after adding the water, heat the same slowly in a double boiler until a temperature of substantially 172° F. is attained. During such heating, the mixture is constantly stirred and care is taken that the temperature referred to is not exceeded. The mixture is then permitted to cool to a temperature of 80 or 85° F. and this temperature is maintained while the following ingredients in substantially the proportions stated are successively and slowly added:

| | |
|---|---|
| Gallic acid (powdered) | 336 grains, |
| Tannic acid | 120 grains, |
| Ferrous sulphate (granulated C. P.) | 252 grains. |
| Hydrochloric acid (18%) | 130 minims, |
| Carbolic acid (90%) | 1½ drachms, |
| Pure glycerine | 2 drachms, |
| Blue aniline A | 217 grains, |
| Indigotin | 68 grains. |

Blue aniline A above referred to is to be understood as referring to sodium salts of trisulpotriphenylpararosaniline and trisulpotriphenylrosaniline.

Each of the ingredients must be separately and slowly added, while constantly stirring the heated mixture in order that the ingredients may be thoroughly agglomerated or associated at the temperature between 80 and 85° F. After such thorough mixture or association of the several ingredients is obtained the temperature of the mixture may be raised to 95° F. and after further mixing at the latter temperature, the mixture in its viscid condition is then poured into collapsible lead tubes and permitted to stand for a period of twenty-four hours before sealing said tubes.

A mixture of the above specified ingredients in the stated proportions will produce about four fluid ounces of the resultant ink paste which is sufficient to produce one gallon of ink after dilution.

The above described dilutable ink paste comprises a base of viscid matter together with gallic acid, ferrous sulphate, hydrochloric acid, carbolic acid, and a coloring ingredient to which there is added tannic acid in such definite proportion relative to the other ingredients as has been found to produce maximum permanency sufficient for all ordinary writing requirements. The percentage or proportion of the tannic acid in the product, is of first importance, since it is also essential to the commercial success of such an ink product that the product both in its concentrated and diluted state, shall possess a very high degree of stability or resistance to decomposition producing chemical reactions, and a minimum of corrosive influence upon metals. The herein described ink product has these desirable attributes. In other words, the product will keep without chemical change over a long period of time, has such a high degree of color permanency that the writing is easily legible in a poor light, even after the lapse of years, and will not seriously corrode writing pens of steel or other metal.

The foregoing formula is given with the assumption that the water used therein contains little alkaline matter. Where water is used in compounding the ink paste which contains considerable alkaline, acetic acid may be added to reduce the alkilinity.

The resultant product produces a suitable paste composition for vending in collapsible tubes which is a highly concentrated ink body. This paste will however, readily dissolve in either hot or cold water when it is desired to use the same for writing purposes.

From the foregoing description, it will be seen that I have produced an ink composition in paste form which possesses all the advantages of the patented product, and in addition thereto provides absolute color permanency, or in other words a non-fading ink by means of which hand written documents may be preserved practically indefinitely and in substantially their original condition of legibility.

The immunity of this new product to the effects of water or atmospheric conditions has been definitely established by the most rigid tests. At the same time, the addition of the tannic acid to the patented product does not materially increase the manufacturing cost of such an ink paste.

I have herein disclosed what I have found to be a preferable practical embodiment of the invention, but it will be understood that my new product is susceptible to more or less change or variation in the ingredients employed and in the relative proportions in which they are mixed, as well as in the several steps to be performed in the process of making or compounding the same. It is therefore, to be understood that I reserve the privilege of resorting to all such changes as may be fairly considered within the spirit and scope of the invention as claimed.

I claim:

1. An ink in paste form comprising the following ingredients mixed in substantially the proportions stated:

Cold water_____ 2 ounces,
White potato dextrin_____ 1 ounce,
Powdered gallic acid_____ 336 grains,
Tannic acid_____ 120 grains,
Granulated ferrous sulphate___ 252 grains,
Hydrochloric acid_____ 130 minims,
Carbolic acid_____ 1½ drachms,
Pure glycerine_____ 2 drachms,
Blue aniline A_____ 217 grains,
Indigotin_____ 68 grains.
Acetic acid.

2. In an ink composition, in the form of paste comprising water, white potato dextrin, hydrochloric acid, carbolic acid, glycerine, coloring matter and acetic acid; ferrous sulphate, gallic acid and tannic acid, in a proportion in which the weight of the gallic acid is substantially three times that of the weight of the tannic acid.

3. In a dilutable ink paste composition having a base of viscid matter combined with ferrous sulphate, hydrochloric acid, carbolic acid and coloring matter; tannic acid in such proportion to the other ingredients as will increase the color permanency of the product with maximum stability of the product in both its concentrated and diluted state and a minimum corrosive influence to metal.

In testimony that I claim the foregoing as my invention, I have signed my name hereto.

FRANK B. COONEY.